J. BRITTON.
Dies for Shaping Bails for Tea-Kettles.
Reissued Dec. 8, 1874.
No. 6,163.
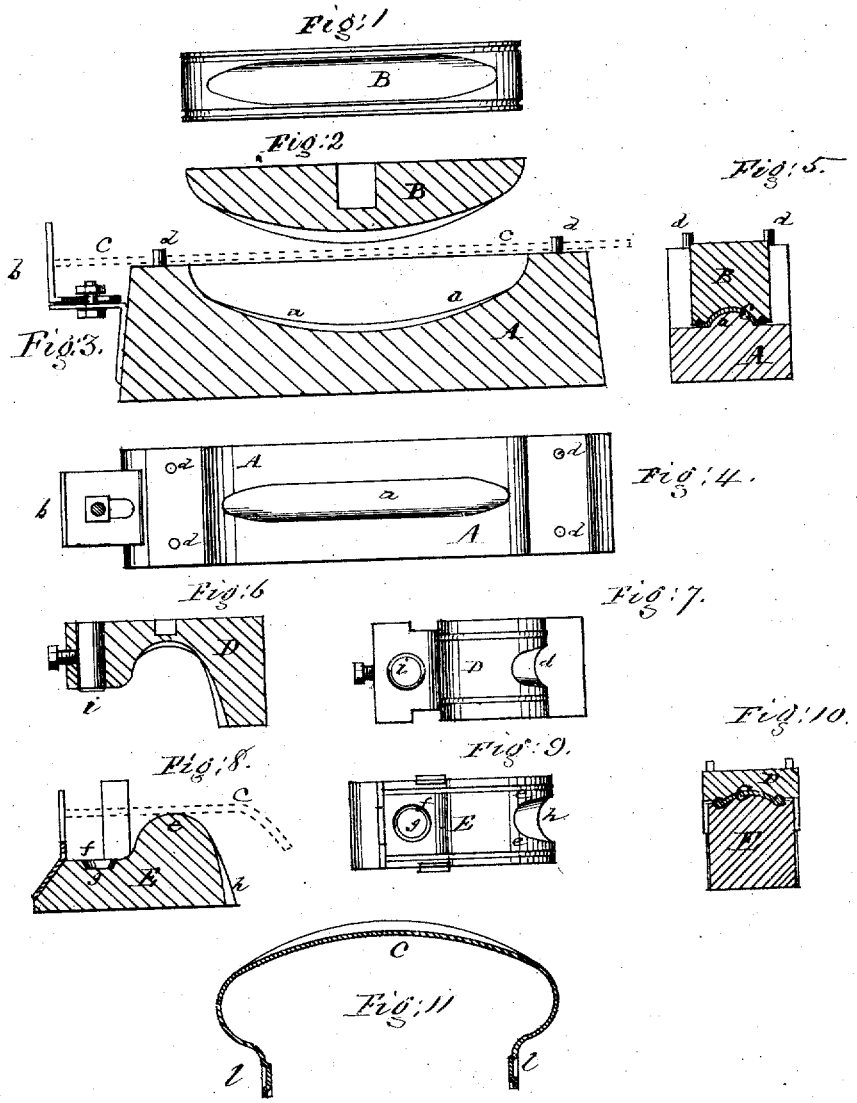
Witnesses
Charles L. Parrish
Griffen B. Halsted
Inventor
James Britton
THE GRAPHIC CO. PHOTO-LITH. 39 & 41 PARK PLACE, N.Y.

UNITED STATES PATENT OFFICE.

JAMES BRITTON, OF BROOKLYN, NEW YORK.

IMPROVEMENT IN DIES FOR SHAPING BAILS FOR TEA-KETTLES.

Specification forming part of Letters Patent No. 125,932, dated April 23, 1872; reissue No. 6,163, dated December 8, 1874; application filed May 14, 1874.

*To all whom it may concern:*

Be it known that I, JAMES BRITTON, of Brooklyn, Kings county, and State of New York, have invented a new and useful Improvement in Dies for Corrugating and Shaping Tea-Kettle Bails, of which the following is a specification:

Figure 1 is a bottom view of the corrugating-punch; Fig. 2, a longitudinal cut-sectional view of the same. Fig. 3 is a longitudinal cut-sectional view of the corrugating-die. Fig. 4 is a top view of the corrugating-punch. Fig. 5 is a transverse cut-sectional view of the punch and die. Fig. 6 is a vertical longitudinal cut-sectional view of the punch for shaping the ends of the bail and countersink therein for securing it to the ear-pieces attached to the kettle. Figs. 7 and 8 are top and bottom views of the same. Fig. 9 is a longitudinal cut-section of the same. Fig. 10 is a transverse cut-sectional view of Figs. 6 and 9. Fig. 11 is a longitudinal cut-section of the completed bail.

Similar letters of reference wherever they occur refer to like parts.

This invention consists, first, in shaping or forming the bail by means of the combination of a longitudinally-concave die, having on its face a corrugating-rib, and punch having on its face a corresponding groove and a marginal groove for receiving the wired edges of the blank of metal from which the bail is formed; and, second, in the combination of a punch having a circular projection with a die, having a corresponding circular recess in their outer ends, and a gage for centering the bail, for shaping the ends thereof for attaching the ear-pieces of the kettle thereto.

The operations of making the bail and using the punches and dies are as follows: A flat piece of sheet metal of the required length and width to form the bail is first prepared by wiring the edges of it longitudinally. It is then placed upon a die, A, under a punch, B, in the manner indicated by dotted lines in Fig. 3.

The die A is concave, and the punch B convex longitudinally, to bend the bail to the required curvature. On the face of the die, and longitudinally of its curvature, is formed a corrugating-rib, *a*, corresponding with a matching-groove in the punch B. The object of this is to form a corrugation of the metal lengthwise of the bail, substantially as indicated in Fig. 5, for the purpose of strengthening the bail, and at the same time making it better adapted to the hand when lifting the kettle off the fire. The punch B is also provided with horizontal grooves to receive the wired edge of the blank.

A suitable gage, *b*, for centering the bail, is applied to the die A, and made adjustable for the various kinds or lengths of bails, and guide-pins *d d* fixed to the die, for holding the bail in position laterally.

After the bail has been curved and corrugated between the parts A and B, it is then subjected to the second operation as follows: The ends of the bail, in succession, are put between the punch D and die E. The die E has a projecting ridge, *e*, near a flat end piece, *f*, and a circular recess, *g*, in the latter, and is grooved, as at *h*, in the face of the ridge *e*. The punch D is shaped accordingly, and has a circular projection, *i*, to fit *g*, and a rounded rib, *j*, to fit the groove *h*.

When one end of the bail has been put on the die E in manner indicated by dotted lines, Fig. 9, and the punch D has been brought down by any suitable press, the end of the bail will receive the form or shape indicated in Fig. 11, and will have a circular countersink or recess, *l*, to receive a button of a similar shape formed on the ear-piece attached to the top of the kettle.

By these consecutive operations of the two sets of dies and punches, the bail is first curved and corrugated longitudinally to give it more strength and convenience in handling; and, secondly, is bent and shaped at its ends to adapt it to form an attachment with the top of a kettle by means of ear-pieces secured thereon.

Having now described my improvement in dies for corrugating and shaping the bails of tea-kettles, I will set forth what I claim, and desire to secure by Letters Patent of the United States:

1. The combination of the longitudinally-concave die A, having on its face a corrugating rib, *a*, and the punch B, having on its face a corresponding groove, *a*, and marginal grooves for receiving the wired edges of the blanks, substantially as described, and for the purpose set forth.

2. The combination of the punch D, having a circular projection, *i*, with die E, having a corresponding circular recess, *g*, in their outer ends, and gage *b*, as described, and for the purposes set forth.

JAMES BRITTON.

Witnesses:

CHARLES L. BARRITT,
GRIFFEN B. HALSTED.